(12) United States Patent
Krüger et al.

(10) Patent No.: US 12,459,728 B2
(45) Date of Patent: Nov. 4, 2025

(54) SEAL FOR A SINGLE SERVE CAPSULE

(71) Applicant: GCS GERMAN CAPSULE SOLUTION GMBH, Bergisch Gladbach (DE)

(72) Inventors: Marc Krüger, Bergisch Gladbach (DE); Günter Empl, Bergisch Gladbach (DE)

(73) Assignee: GCS German Capsule Solution GmbH, Bergisch Gladbach (DE)

(*) Notice: Subject to any disclaimer, the term of this patent is extended or adjusted under 35 U.S.C. 154(b) by 263 days.

(21) Appl. No.: 17/294,437

(22) PCT Filed: Nov. 22, 2019

(86) PCT No.: PCT/EP2019/082259
§ 371 (c)(1),
(2) Date: May 17, 2021

(87) PCT Pub. No.: WO2020/104667
PCT Pub. Date: May 28, 2020

(65) Prior Publication Data
US 2022/0063899 A1    Mar. 3, 2022

(30) Foreign Application Priority Data

Nov. 22, 2018 (DE) .................... 10 2018 220 100.5
Jan. 10, 2019 (EP) ..................... 19151178
Feb. 5, 2019 (EP) ..................... 19155589

(51) Int. Cl.
*B65D 85/80* (2006.01)
*B65D 85/804* (2006.01)

(52) U.S. Cl.
CPC .................. *B65D 85/8064* (2020.05)

(58) Field of Classification Search
CPC .............. B65D 85/8043; B65D 85/804; B65D 85/8046; B65D 86/8064; B65D 85/8064; B65B 29/022
See application file for complete search history.

(56) References Cited

U.S. PATENT DOCUMENTS

| 2,778,739 A | 1/1957 | Rodth |
| 3,183,096 A | 5/1965 | Hiscock |

(Continued)

FOREIGN PATENT DOCUMENTS

| AU | 2011281237 A1 | 2/2013 |
| AU | 2014203212 A1 | 7/2014 |

(Continued)

OTHER PUBLICATIONS

International Search Report and Written Opinion for International Application PCT/EP2019/082259, mailed on Jan. 7, 2020.

(Continued)

*Primary Examiner* — Ericson M Lachica
(74) *Attorney, Agent, or Firm* — The Dobrusin Law Firm, P.C.

(57) ABSTRACT

The invention relates to a single serve capsule (1) for preparing a beverage in a beverage preparation machine, said single serve capsule (1) having a liquid-tight base element (2) having a cavity (3) for receiving a beverage raw material and a capsule cover (4) sealing the cavity (3).

8 Claims, 1 Drawing Sheet

(56) References Cited

U.S. PATENT DOCUMENTS

| | | | |
|---|---|---|---|
| 3,631,793 A | 1/1972 | Bednartz | |
| 3,640,727 A | 2/1972 | Heusinkveld | |
| 4,298,649 A | 11/1981 | Meitner | |
| 4,534,985 A | 8/1985 | Gasau | |
| 4,540,595 A | 9/1985 | Acitelli et al. | |
| 4,644,151 A | 2/1987 | Juvinall | |
| 4,676,482 A | 6/1987 | Reece | |
| 4,742,645 A | 5/1988 | Johnston | |
| 4,859,337 A | 8/1989 | Woltermann | |
| 4,860,645 A | 8/1989 | Van Der Lijn et al. | |
| 4,867,993 A | 9/1989 | Nordskog | |
| 4,976,179 A | 12/1990 | Lacrouts-Cazenave | |
| 4,995,310 A | 2/1991 | Van Der Lijn et al. | |
| 5,012,629 A | 5/1991 | Rehman et al. | |
| 5,028,769 A | 7/1991 | Claypool et al. | |
| 5,108,768 A | 4/1992 | So | |
| 5,242,702 A | 9/1993 | Fond | |
| 5,243,164 A | 9/1993 | Erickson et al. | |
| 5,251,758 A | 10/1993 | Kolacek | |
| 5,285,041 A | 2/1994 | Wright | |
| 5,298,267 A | 3/1994 | Gruenbacher | |
| 5,325,765 A | 7/1994 | Sylvan et al. | |
| 5,460,078 A | 10/1995 | Weller | |
| 5,472,719 A | 12/1995 | Favre | |
| 5,496,573 A | 3/1996 | Tsuji et al. | |
| 5,501,945 A | 3/1996 | Kanakkanatt | |
| 5,535,765 A | 7/1996 | Takashima | |
| 5,601,716 A | 2/1997 | Heinrich et al. | |
| 5,637,850 A | 6/1997 | Honda | |
| 5,638,740 A | 6/1997 | Cai | |
| 5,649,472 A | 7/1997 | Fond et al. | |
| 5,656,311 A | 8/1997 | Fond | |
| 5,672,368 A | 9/1997 | Perkins | |
| 5,677,522 A | 10/1997 | Rice et al. | |
| 5,725,261 A | 3/1998 | Rahn | |
| 5,840,189 A | 11/1998 | Sylvan et al. | |
| 5,888,549 A | 3/1999 | Buchholz et al. | |
| 5,895,672 A | 4/1999 | Cooper | |
| 5,917,165 A | 6/1999 | Platt et al. | |
| 5,941,055 A | 8/1999 | Coates | |
| 5,948,455 A | 9/1999 | Schaeffer et al. | |
| 5,980,743 A | 11/1999 | Bairischer | |
| 5,994,677 A | 11/1999 | Akerlind | |
| 6,038,963 A * | 3/2000 | Patterson | A47J 31/20 99/287 |
| 6,153,026 A | 11/2000 | Michotte | |
| 6,189,438 B1 | 2/2001 | Bielfeldt et al. | |
| 6,199,780 B1 | 3/2001 | Görlitz | |
| 6,202,929 B1 | 3/2001 | Verschuur et al. | |
| 6,261,611 B1 * | 7/2001 | Berman | B65D 83/0005 426/115 |
| 6,299,926 B1 | 10/2001 | Balakrishnan et al. | |
| 6,440,256 B1 | 8/2002 | Gordon et al. | |
| 6,451,332 B1 | 9/2002 | Tanaka et al. | |
| 6,589,577 B2 | 7/2003 | Lazaris et al. | |
| 6,598,800 B1 | 7/2003 | Schmit et al. | |
| 6,607,762 B2 | 8/2003 | Lazaris et al. | |
| 6,627,244 B2 | 9/2003 | Omura | |
| 6,645,537 B2 | 11/2003 | Sweeney et al. | |
| 6,655,260 B2 | 12/2003 | Lazaris | |
| 6,706,652 B2 | 3/2004 | Groten et al. | |
| 6,854,378 B2 | 2/2005 | Jarisch et al. | |
| 6,861,086 B2 | 3/2005 | Buckingham et al. | |
| 6,880,454 B2 | 4/2005 | Kollep | |
| 6,948,420 B2 | 9/2005 | Kirschner et al. | |
| 6,994,879 B2 | 2/2006 | Cirigliano et al. | |
| 7,408,094 B2 | 8/2008 | Little et al. | |
| 7,444,925 B2 | 11/2008 | Mahlich | |
| 7,464,518 B2 | 12/2008 | Ansinn | |
| 7,543,527 B2 | 6/2009 | Schmed | |
| 7,552,672 B2 | 6/2009 | Schmed | |
| 7,595,870 B2 | 9/2009 | Ringlien | |
| 7,673,558 B2 | 3/2010 | Panesar et al. | |
| 7,678,451 B2 | 3/2010 | Gelissen et al. | |
| 7,685,930 B2 | 3/2010 | Mandralis et al. | |
| 7,703,381 B2 | 4/2010 | Liverani et al. | |
| 7,763,295 B2 | 7/2010 | Mayr et al. | |
| 7,815,953 B2 | 10/2010 | Mastropasqua et al. | |
| 7,935,646 B2 | 5/2011 | Viazmensky et al. | |
| 7,946,217 B2 | 5/2011 | Favre et al. | |
| 7,981,451 B2 | 7/2011 | Ozanne | |
| 8,039,029 B2 | 10/2011 | Ozanne | |
| 8,039,034 B2 | 10/2011 | Ozanne | |
| 8,088,423 B2 | 1/2012 | Ohresser et al. | |
| 8,109,200 B2 | 2/2012 | Hansen | |
| 8,114,461 B2 | 2/2012 | Perlman et al. | |
| 8,163,318 B2 | 4/2012 | Ozanne et al. | |
| 8,168,908 B2 | 5/2012 | Heimann | |
| 8,257,766 B2 | 9/2012 | Yoakim et al. | |
| 8,276,639 B2 | 10/2012 | Binacchi | |
| 8,304,006 B2 | 11/2012 | Yoakim et al. | |
| 8,307,754 B2 | 11/2012 | Trenite et al. | |
| 8,322,271 B2 | 12/2012 | Glucksman et al. | |
| 8,361,527 B2 | 1/2013 | Winkler et al. | |
| 8,474,368 B2 | 7/2013 | Kilber et al. | |
| 8,491,948 B2 | 7/2013 | Ozanne et al. | |
| 8,491,976 B2 | 7/2013 | Sato et al. | |
| 8,505,440 B2 | 8/2013 | Kirschner et al. | |
| 8,512,886 B2 | 8/2013 | Ozanne | |
| 8,720,320 B1 | 5/2014 | Rivera | |
| 8,734,881 B2 | 5/2014 | Yoakim et al. | |
| 8,747,775 B2 | 6/2014 | Sandvick | |
| 8,794,125 B1 | 8/2014 | Rivera | |
| 8,906,436 B2 | 12/2014 | Nowak | |
| 8,916,220 B1 | 12/2014 | Mahlich et al. | |
| 8,956,672 B2 | 2/2015 | Yoakim et al. | |
| 8,960,076 B2 | 2/2015 | Epars et al. | |
| 8,986,762 B2 | 3/2015 | Eichler et al. | |
| 9,049,958 B2 | 6/2015 | Fischer | |
| 9,072,402 B2 | 7/2015 | Ryser | |
| 9,079,705 B2 | 7/2015 | Digiuni | |
| 9,125,515 B2 | 9/2015 | Aardenburg | |
| 9,150,347 B2 | 10/2015 | Scheiber | |
| 9,204,751 B2 | 12/2015 | Peterson | |
| 9,216,854 B2 | 12/2015 | Schreiber | |
| 9,226,611 B2 | 1/2016 | Yoakim et al. | |
| 9,242,791 B2 | 1/2016 | Denisart et al. | |
| 9,271,602 B2 | 3/2016 | Beaulieu et al. | |
| 9,277,837 B2 | 3/2016 | Yoakim et al. | |
| 9,290,317 B2 | 3/2016 | Quinn et al. | |
| 9,295,278 B2 | 3/2016 | Nowak | |
| 9,357,791 B2 | 6/2016 | Fountain et al. | |
| 9,359,126 B2 | 6/2016 | Wong et al. | |
| 9,359,128 B2 | 6/2016 | Mahlich | |
| 9,392,902 B2 | 7/2016 | Parentes et al. | |
| 9,394,101 B2 | 7/2016 | Empl | |
| 9,399,546 B2 | 7/2016 | Abegglen et al. | |
| 9,409,703 B2 | 8/2016 | Krüger et al. | |
| 9,409,704 B2 | 8/2016 | Digiuni et al. | |
| 9,415,931 B2 | 8/2016 | Gerbaulet et al. | |
| 9,428,328 B2 | 8/2016 | Trombetta et al. | |
| 9,428,329 B2 | 8/2016 | Trombetta et al. | |
| 9,434,525 B2 | 9/2016 | Fabozzi et al. | |
| 9,486,108 B1 | 11/2016 | Douglas et al. | |
| 9,598,230 B2 | 3/2017 | Schmed et al. | |
| 9,603,478 B2 | 3/2017 | Deleo | |
| 9,656,798 B2 | 5/2017 | Kamerbeek et al. | |
| 9,808,112 B2 | 11/2017 | Favero et al. | |
| 9,833,107 B2 * | 12/2017 | Mariller | A47J 31/407 |
| 9,969,546 B2 | 5/2018 | Krüger et al. | |
| 10,004,362 B2 | 6/2018 | Yang | |
| 10,011,421 B2 | 7/2018 | Bartoli et al. | |
| 10,111,554 B2 | 10/2018 | Roberts et al. | |
| 10,342,377 B2 | 7/2019 | Cable et al. | |
| 10,343,838 B2 | 7/2019 | Empl | |
| 10,376,089 B2 | 8/2019 | Deuber et al. | |
| 10,450,130 B2 | 10/2019 | Hansen | |
| 10,455,974 B2 | 10/2019 | Talon | |
| 10,472,165 B2 | 11/2019 | Empl | |
| 2001/0014393 A1 | 8/2001 | Groten et al. | |
| 2001/0038204 A1 | 11/2001 | Nojima et al. | |
| 2001/0047724 A1 | 12/2001 | Lazaris | |
| 2001/0048957 A1 | 12/2001 | Lazaris et al. | |
| 2002/0020659 A1 | 2/2002 | Sweeney | |

(56) References Cited

U.S. PATENT DOCUMENTS

| | | |
|---|---|---|
| 2002/0048621 A1 | 4/2002 | Boyd et al. |
| 2002/0085164 A1 | 7/2002 | Stanford-Clark |
| 2002/0088807 A1 | 7/2002 | Perkovic et al. |
| 2002/0110626 A1 | 8/2002 | Buckingham et al. |
| 2003/0005826 A1 | 1/2003 | Sargent et al. |
| 2003/0033938 A1 | 2/2003 | Halliday et al. |
| 2003/0039731 A1 | 2/2003 | Dalton et al. |
| 2003/0116029 A1 | 6/2003 | Kollep |
| 2003/0121979 A1 | 7/2003 | Haens et al. |
| 2003/0148096 A1 | 8/2003 | Groten et al. |
| 2003/0172813 A1 | 9/2003 | Schifferle |
| 2003/0217643 A1* | 11/2003 | Masek ............... B65D 85/8046 99/279 |
| 2003/0217644 A1 | 11/2003 | Jarisch et al. |
| 2003/0222089 A1 | 12/2003 | Hale |
| 2004/0005384 A1 | 1/2004 | Cai |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0118295 A1 | 6/2004 | Angeles |
| 2004/0142070 A1 | 7/2004 | Haen |
| 2004/0155113 A1 | 8/2004 | Urano et al. |
| 2004/0182250 A1 | 9/2004 | Halliday et al. |
| 2004/0228955 A1 | 11/2004 | Denisart et al. |
| 2004/0231521 A1 | 11/2004 | Yoakim |
| 2004/0265436 A1* | 12/2004 | Cai ..................... B65D 85/8061 426/112 |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0056153 A1 | 3/2005 | Nottingham et al. |
| 2005/0061478 A1 | 3/2005 | Huang |
| 2005/0136155 A1 | 6/2005 | Jordan et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0158437 A1 | 7/2005 | Itaya et al. |
| 2005/0160919 A1 | 7/2005 | Balkau |
| 2005/0166763 A1 | 8/2005 | Scarchilli et al. |
| 2005/0183581 A1 | 8/2005 | Kirschner et al. |
| 2005/0266122 A1 | 12/2005 | Franceschi |
| 2006/0010744 A1 | 1/2006 | Schumacher |
| 2006/0032427 A1 | 2/2006 | Ishii et al. |
| 2006/0065127 A1 | 3/2006 | Dalton et al. |
| 2006/0074165 A1 | 4/2006 | Gelissen et al. |
| 2006/0084344 A1 | 4/2006 | Bonneh |
| 2006/0107841 A1 | 5/2006 | Schifferle |
| 2006/0110507 A1 | 5/2006 | Yoakim et al. |
| 2006/0148968 A1 | 7/2006 | Van Duijnhoven et al. |
| 2006/0194004 A1 | 8/2006 | Niemoller |
| 2006/0228447 A1 | 10/2006 | Ganesan et al. |
| 2006/0236871 A1 | 10/2006 | Ternite et al. |
| 2007/0148290 A1 | 6/2007 | Ternite et al. |
| 2007/0157821 A1 | 7/2007 | Panesar et al. |
| 2007/0181003 A1* | 8/2007 | Bardazzi ............ B65D 85/8055 99/279 |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2007/0259139 A1* | 11/2007 | Furneaux ............ B32B 27/10 428/34.3 |
| 2008/0024536 A1 | 1/2008 | Hirano et al. |
| 2008/0028946 A1 | 2/2008 | Kirschner et al. |
| 2008/0038441 A1 | 2/2008 | Kirschner |
| 2008/0050488 A1 | 2/2008 | Koeling et al. |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2008/0302800 A1* | 12/2008 | Chou ................. B65D 81/3869 220/62.12 |
| 2009/0004335 A1* | 1/2009 | MacMahon ......... A47J 31/0689 426/78 |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0092711 A1 | 4/2009 | Ninh et al. |
| 2009/0126577 A1 | 5/2009 | Ternite |
| 2009/0136626 A1 | 5/2009 | Mueller |
| 2009/0139926 A1 | 6/2009 | Hassenbauck |
| 2009/0173043 A1 | 7/2009 | Bloome et al. |
| 2009/0211458 A1 | 8/2009 | Denisart et al. |
| 2009/0211713 A1 | 8/2009 | Binacchi |
| 2009/0223373 A1* | 9/2009 | Kollep ............... B65D 85/8064 99/279 |
| 2009/0285953 A1 | 11/2009 | Reniers |
| 2009/0289121 A1 | 11/2009 | Maeda et al. |
| 2009/0291379 A1 | 11/2009 | Oota et al. |
| 2009/0311384 A1* | 12/2009 | MacMahon ............ A23C 11/08 426/77 |
| 2009/0320692 A1* | 12/2009 | Simanski ........... B65D 85/8064 206/0.5 |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0015307 A1* | 1/2010 | Abegglen ......... B29C 45/14336 425/574 |
| 2010/0028495 A1 | 2/2010 | Novak et al. |
| 2010/0050880 A1 | 3/2010 | Suter et al. |
| 2010/0051532 A1 | 3/2010 | Wawrla et al. |
| 2010/0054532 A1 | 3/2010 | Mitte et al. |
| 2010/0055260 A1* | 3/2010 | Sweet ................ B65D 81/3453 426/243 |
| 2010/0078480 A1 | 4/2010 | Aker |
| 2010/0107888 A1* | 5/2010 | Kollep .................... A47J 31/06 99/295 |
| 2010/0108541 A1 | 5/2010 | Venturi |
| 2010/0132564 A1 | 6/2010 | Ozanne et al. |
| 2010/0178404 A1 | 7/2010 | Yoakim et al. |
| 2010/0181378 A1 | 7/2010 | Hayakawa et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0264640 A1 | 10/2010 | Lane et al. |
| 2010/0288131 A1* | 11/2010 | Kilber ................ B65D 85/8061 99/290 |
| 2010/0288133 A1 | 11/2010 | Litzka et al. |
| 2010/0303964 A1 | 12/2010 | Beaulieu et al. |
| 2010/0308397 A1 | 12/2010 | Ariyoshi |
| 2010/0313766 A1* | 12/2010 | Suggi Liverani ... A47J 31/0673 99/295 |
| 2011/0005399 A1 | 1/2011 | Epars et al. |
| 2011/0012291 A1 | 1/2011 | Middleton et al. |
| 2011/0020500 A1 | 1/2011 | Eichler et al. |
| 2011/0033580 A1 | 2/2011 | Biesheuvel et al. |
| 2011/0041702 A1 | 2/2011 | Yoakim |
| 2011/0064852 A1 | 3/2011 | Mann |
| 2011/0076361 A1 | 3/2011 | Peterson et al. |
| 2011/0097450 A1 | 4/2011 | Krüger |
| 2011/0142996 A1 | 6/2011 | Krüger |
| 2011/0185910 A1* | 8/2011 | Ryser ................ B65D 85/8064 426/77 |
| 2011/0186450 A1 | 8/2011 | Bonacci |
| 2011/0189350 A1 | 8/2011 | Van Belleghem et al. |
| 2011/0200725 A1 | 8/2011 | Kollep et al. |
| 2011/0212225 A1 | 9/2011 | Mariller |
| 2011/0217421 A1 | 9/2011 | Parentes et al. |
| 2011/0236541 A1* | 9/2011 | Gerbaulet .......... B65D 85/8061 426/106 |
| 2011/0250333 A1 | 10/2011 | Ozanne |
| 2011/0250812 A1 | 10/2011 | Pourdeyhimi et al. |
| 2011/0259204 A1* | 10/2011 | Kaeser ..................... F16J 15/14 427/372.2 |
| 2011/0303095 A1 | 12/2011 | Fu et al. |

(56) References Cited

U.S. PATENT DOCUMENTS

| | | |
|---|---|---|
| 2011/0308397 A1 | 12/2011 | Sinot et al. |
| 2012/0006685 A1 | 1/2012 | Van Engelen |
| 2012/0015080 A1 | 1/2012 | Roulin et al. |
| 2012/0038063 A1 | 2/2012 | Meyer et al. |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1 | 3/2012 | Mahlich |
| 2012/0070551 A1 | 3/2012 | Mahlich |
| 2012/0073418 A1 | 3/2012 | Aardenburg |
| 2012/0090473 A1 | 4/2012 | Deuber |
| 2012/0097041 A1 | 4/2012 | Bucher et al. |
| 2012/0097602 A1 | 4/2012 | Tedford |
| 2012/0100264 A1 | 4/2012 | Bucher et al. |
| 2012/0109186 A1 | 5/2012 | Parrott et al. |
| 2012/0121765 A1 | 5/2012 | Kamerbeek et al. |
| 2012/0123106 A1 | 5/2012 | Joos |
| 2012/0126834 A1 | 5/2012 | Kleinhans |
| 2012/0148709 A1 | 6/2012 | Kamerbeek et al. |
| 2012/0177788 A1 | 7/2012 | Seid et al. |
| 2012/0180670 A1 | 7/2012 | Yoakim et al. |
| 2012/0183657 A1 | 7/2012 | Marina et al. |
| 2012/0195155 A1 | 8/2012 | Gennai et al. |
| 2012/0201933 A1 | 8/2012 | Dran et al. |
| 2012/0207893 A1 | 8/2012 | Krüger |
| 2012/0207895 A1 | 8/2012 | Rivera |
| 2012/0225168 A1* | 9/2012 | Kamerbeek ........ B65D 85/8064 206/0.5 |
| 2012/0231123 A1* | 9/2012 | Kamerbeek ........... A47J 31/407 426/112 |
| 2012/0231124 A1* | 9/2012 | Kamerbeek ........ B65D 85/8055 426/112 |
| 2012/0251668 A1 | 10/2012 | Wong et al. |
| 2012/0251672 A1 | 10/2012 | Kamerbeek et al. |
| 2012/0251677 A1* | 10/2012 | Yoakim ................... A47J 31/22 426/112 |
| 2012/0251694 A1 | 10/2012 | Kamerbeek et al. |
| 2012/0258210 A1 | 10/2012 | Wong et al. |
| 2012/0295234 A1 | 11/2012 | Rognon et al. |
| 2012/0301581 A1 | 11/2012 | Abegglen et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064936 A1* | 3/2013 | Meelker ............. B65D 85/8043 426/112 |
| 2013/0064937 A1 | 3/2013 | Jarisch et al. |
| 2013/0084363 A1 | 4/2013 | Krüger et al. |
| 2013/0084376 A1 | 4/2013 | Fischer et al. |
| 2013/0087051 A1 | 4/2013 | Frydman |
| 2013/0099597 A1 | 4/2013 | Perentes et al. |
| 2013/0101716 A1 | 4/2013 | Beaulieu et al. |
| 2013/0122153 A1 | 5/2013 | Ferrier et al. |
| 2013/0122167 A1 | 5/2013 | Winkler et al. |
| 2013/0125762 A1 | 5/2013 | Dogan et al. |
| 2013/0129872 A1 | 5/2013 | Krüger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0156899 A1 | 6/2013 | Quinn et al. |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0224343 A1 | 8/2013 | Tremblay |
| 2013/0230627 A1 | 9/2013 | Hansen et al. |
| 2013/0243910 A1 | 9/2013 | Krüger et al. |
| 2013/0243911 A1* | 9/2013 | Abegglen ............... A47J 31/22 426/115 |
| 2013/0309364 A1* | 11/2013 | Gerbaulet .......... B65D 85/8046 426/77 |
| 2013/0309371 A1* | 11/2013 | Abegglen .......... B65D 85/8052 426/112 |
| 2013/0312619 A1 | 11/2013 | Spiegel et al. |
| 2013/0323366 A1 | 12/2013 | Gerbaulet et al. |
| 2013/0327223 A1 | 12/2013 | Bartoli et al. |
| 2013/0341478 A1 | 12/2013 | Mariller |
| 2014/0004231 A1 | 1/2014 | Norton et al. |
| 2014/0017359 A1 | 1/2014 | Krüger et al. |
| 2014/0023754 A1* | 1/2014 | Abegglen ................ A23F 5/262 426/112 |
| 2014/0026761 A1 | 1/2014 | Bartoli et al. |
| 2014/0083873 A1* | 3/2014 | Capitani ............ B65D 85/8061 206/0.5 |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0157993 A1 | 6/2014 | Brouwer et al. |
| 2014/0161936 A1 | 6/2014 | Trombetta et al. |
| 2014/0170281 A1* | 6/2014 | Zweed .................... B65D 53/02 426/115 |
| 2014/0178537 A1* | 6/2014 | Zweed .................... A23F 5/262 426/433 |
| 2014/0178538 A1 | 6/2014 | Husband et al. |
| 2014/0196608 A1 | 7/2014 | Amrein et al. |
| 2014/0199442 A1* | 7/2014 | Orsi .................. B65D 85/8043 426/112 |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0234494 A1* | 8/2014 | Doglioni Majer . B65D 85/8064 426/115 |
| 2014/0263033 A1 | 9/2014 | Fu et al. |
| 2014/0272018 A1 | 9/2014 | Koller et al. |
| 2014/0287104 A1 | 9/2014 | Austin et al. |
| 2014/0287105 A1 | 9/2014 | Husband et al. |
| 2014/0308405 A1* | 10/2014 | Okada ..................... C08L 67/00 428/35.8 |
| 2014/0318380 A1* | 10/2014 | Doglioni Majer .... A47J 31/407 426/115 |
| 2014/0346022 A1 | 11/2014 | Keller et al. |
| 2014/0348984 A1 | 11/2014 | Zeller et al. |
| 2014/0370161 A1* | 12/2014 | Abegglen ................ A47J 31/22 426/115 |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1* | 2/2015 | Deuber ................... A23F 5/262 99/295 |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0132441 A1 | 5/2015 | Accursi |
| 2015/0151903 A1* | 6/2015 | Bartoli ............... B65D 85/8064 206/0.5 |
| 2015/0157164 A1 | 6/2015 | Digiuni |
| 2015/0158665 A1 | 6/2015 | Krüger et al. |
| 2015/0166204 A1 | 6/2015 | Rea et al. |
| 2015/0173558 A1 | 6/2015 | Cross et al. |
| 2015/0175347 A1 | 6/2015 | Empl |
| 2015/0191302 A1 | 7/2015 | Gerbaulet et al. |
| 2015/0201790 A1 | 7/2015 | Smith et al. |
| 2015/0208852 A1* | 7/2015 | Doglioni Majer . B65D 85/8064 426/115 |
| 2015/0216350 A1* | 8/2015 | Talon .................... A47J 31/0673 99/295 |
| 2015/0239652 A1 | 8/2015 | Trombetta et al. |
| 2015/0239653 A1 | 8/2015 | Dogan et al. |
| 2015/0246741 A1 | 9/2015 | Hansen et al. |
| 2015/0274411 A1 | 10/2015 | Krüger |
| 2015/0296831 A1* | 10/2015 | Noth ....................... A23G 9/10 141/82 |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |

(56) References Cited

U.S. PATENT DOCUMENTS

| | | | |
|---|---|---|---|
| 2015/0336736 A1* | 11/2015 | Cabilli | B29C 45/0001 264/494 |
| 2015/0344220 A1 | 12/2015 | Sanders | |
| 2015/0352044 A1 | 12/2015 | Benson et al. | |
| 2015/0353275 A1 | 12/2015 | Accursi | |
| 2015/0366397 A1 | 12/2015 | Flick et al. | |
| 2015/0375915 A1* | 12/2015 | Sjong | B65B 63/08 53/473 |
| 2015/0375926 A1 | 12/2015 | Fischer | |
| 2016/0001968 A1 | 1/2016 | Krüger et al. | |
| 2016/0017166 A1* | 1/2016 | Zischka | B05D 1/26 427/508 |
| 2016/0037961 A1* | 2/2016 | Digiuni | B65D 85/8061 99/295 |
| 2016/0045060 A1 | 2/2016 | Flick | |
| 2016/0058234 A1 | 3/2016 | Empl | |
| 2016/0066591 A1 | 3/2016 | Halliday et al. | |
| 2016/0075506 A1 | 3/2016 | Chapman et al. | |
| 2016/0137402 A1* | 5/2016 | Talon | A47J 31/407 426/115 |
| 2016/0174754 A1 | 6/2016 | Flick et al. | |
| 2016/0194146 A1 | 7/2016 | Schelch et al. | |
| 2016/0198889 A1 | 7/2016 | Flick et al. | |
| 2016/0200502 A1* | 7/2016 | Grossman | A23L 21/25 426/115 |
| 2016/0207696 A9 | 7/2016 | Trombetta et al. | |
| 2016/0207697 A1* | 7/2016 | La Gamba | B65D 85/8064 |
| 2016/0242594 A1 | 8/2016 | Empl et al. | |
| 2016/0251149 A1* | 9/2016 | Gerbaulet | A23F 5/262 426/115 |
| 2016/0251150 A1 | 9/2016 | Macchi et al. | |
| 2016/0255987 A1 | 9/2016 | Brouwer et al. | |
| 2016/0279858 A1* | 9/2016 | Melrose | B29C 59/007 |
| 2016/0280453 A1 | 9/2016 | Accursi | |
| 2016/0325921 A1 | 11/2016 | Empl | |
| 2016/0332759 A1 | 11/2016 | Trombetta et al. | |
| 2016/0338528 A1 | 11/2016 | Yui et al. | |
| 2016/0340110 A1 | 11/2016 | Trombetta et al. | |
| 2016/0355327 A1* | 12/2016 | Minganti | B29C 48/21 |
| 2016/0362247 A1* | 12/2016 | Bartoli | B65D 85/8043 |
| 2016/0367069 A1 | 12/2016 | Cable et al. | |
| 2017/0008694 A1 | 1/2017 | Andreae et al. | |
| 2017/0020329 A1 | 1/2017 | Douglas et al. | |
| 2017/0027374 A1 | 2/2017 | Smith et al. | |
| 2017/0051800 A1 | 2/2017 | Hill et al. | |
| 2017/0055757 A1 | 3/2017 | Fu et al. | |
| 2017/0087814 A1* | 3/2017 | Goel | B32B 37/02 |
| 2017/0119198 A1 | 5/2017 | Barber | |
| 2017/0143157 A1* | 5/2017 | Tentorio | A47J 31/4492 |
| 2017/0174417 A1 | 6/2017 | Nordqvist et al. | |
| 2017/0183145 A1 | 6/2017 | Cabilli et al. | |
| 2017/0190451 A1* | 7/2017 | van der Vliet | B65D 85/8043 |
| 2017/0210553 A1* | 7/2017 | Burress | G07F 13/10 |
| 2017/0223879 A1* | 8/2017 | Mitchell | B65D 81/24 |
| 2017/0231421 A1 | 8/2017 | Talon | |
| 2017/0247179 A1 | 8/2017 | Rubinstein | |
| 2017/0362020 A1 | 12/2017 | Hanneson et al. | |
| 2018/0105355 A1* | 4/2018 | Harif | B65D 85/8064 |
| 2018/0148250 A1* | 5/2018 | Schaude | B65D 85/8049 |
| 2018/0194545 A1* | 7/2018 | Bisio | B65D 85/804 |
| 2018/0201436 A1* | 7/2018 | Savage | B65D 85/8055 |
| 2018/0265279 A1* | 9/2018 | Schäling | B65D 85/8067 |
| 2018/0273286 A1* | 9/2018 | Dijkstra | B65D 85/8064 |
| 2018/0290825 A1* | 10/2018 | Dijkstra | A47J 31/369 |
| 2018/0303281 A1 | 10/2018 | Carr et al. | |
| 2019/0016528 A1* | 1/2019 | Kuhl | B65D 65/466 |
| 2019/0208950 A1 | 7/2019 | Wong et al. | |

FOREIGN PATENT DOCUMENTS

| | | |
|---|---|---|
| CA | 2436389 A1 | 8/2002 |
| CA | 2399290 C | 1/2006 |
| CA | 2399283 C | 5/2007 |
| CA | 2661921 A1 | 3/2008 |
| CA | 2763746 A1 | 3/2010 |
| CA | 2784752 C | 6/2011 |
| CA | 2662071 C | 7/2011 |
| CA | 2824135 A1 | 12/2011 |
| CA | 2810237 A1 | 3/2012 |
| CA | 2531544 C | 5/2012 |
| CA | 2662069 C | 1/2013 |
| CA | 2785843 A1 | 2/2013 |
| CA | 2788283 A1 | 3/2013 |
| CA | 2866119 A1 | 9/2013 |
| CA | 2872667 A1 | 11/2013 |
| CA | 2874025 A1 | 12/2013 |
| CA | 2877090 A1 | 1/2014 |
| CA | 2888658 C | 6/2014 |
| CA | 2898173 A1 | 8/2014 |
| CA | 2902231 A1 | 8/2014 |
| CA | 2901582 A1 | 11/2014 |
| CA | 2832794 C | 3/2016 |
| CA | 2833096 C | 5/2016 |
| CN | 101016667 A | 8/2007 |
| CN | 101043835 A | 9/2007 |
| CN | 101263066 A | 9/2008 |
| CN | 101646613 A | 2/2010 |
| CN | 101828840 A | 9/2010 |
| CN | 101970314 A | 2/2011 |
| CN | 101992905 A | 3/2011 |
| CN | 102365214 A | 2/2012 |
| CN | 102379630 A | 3/2012 |
| CN | 102574631 A | 7/2012 |
| CN | 102574633 A | 7/2012 |
| CN | 102741135 A | 10/2012 |
| CN | 102741136 A | 10/2012 |
| CN | 102958408 A | 3/2013 |
| CN | 103476687 A | 12/2013 |
| CN | 204048139 U | 12/2014 |
| CN | 104334473 A | 2/2015 |
| CN | 104411600 A | 3/2015 |
| CN | 104603029 A | 5/2015 |
| DE | 1207866 B | 12/1965 |
| DE | 3100115 A1 | 11/1981 |
| DE | 69615001 T2 | 3/2002 |
| DE | 202006003115 U1 | 5/2006 |
| DE | 102006004329 A1 | 8/2007 |
| DE | 602004007880 T2 | 4/2008 |
| DE | 102008014758 A1 | 10/2009 |
| DE | 202009014945 U1 | 9/2010 |
| DE | 202010007919 U1 | 11/2010 |
| DE | 102010027485 A1 | 1/2012 |
| DE | 102010034206 A1 | 2/2012 |
| DE | 102011012881 A1 | 3/2012 |
| DE | 202012101513 U1 | 5/2012 |
| DE | 102011010534 A1 | 8/2012 |
| DE | 102011115833 A1 | 4/2013 |
| DE | 102012105282 A1 | 12/2013 |
| DE | 102012110446 A1 | 1/2014 |
| DE | 102012109186 A1 | 3/2014 |
| DE | 102012223291 A1 | 6/2014 |
| DE | 102013215274 A1 | 8/2014 |
| DE | 102014018470 A1 | 6/2016 |
| EP | 0224297 A1 | 6/1987 |
| EP | 0244339 A1 | 11/1987 |
| EP | 0338479 A1 | 10/1989 |
| EP | 453573 A1 | 10/1991 |
| EP | 0468078 A1 | 1/1992 |
| EP | 0468079 A1 | 1/1992 |
| EP | 0656224 A1 | 6/1995 |
| EP | 0859467 A1 | 8/1998 |
| EP | 0865749 A1 | 9/1998 |
| EP | 0923865 A2 | 6/1999 |
| EP | 1118305 A2 | 7/2001 |
| EP | 1129623 A1 | 9/2001 |
| EP | 1221418 A1 | 7/2002 |
| EP | 1263661 A1 | 12/2002 |
| EP | 1344722 A1 | 9/2003 |
| EP | 1344724 A1 | 9/2003 |
| EP | 1363501 A2 | 11/2003 |
| EP | 1471012 A2 | 10/2004 |
| EP | 1555219 A1 | 7/2005 |
| EP | 1559351 A2 | 8/2005 |

(56) References Cited

FOREIGN PATENT DOCUMENTS

| | | |
|---|---|---|
| EP | 1566127 A2 | 8/2005 |
| EP | 1567594 A1 | 8/2005 |
| EP | 1567595 A1 | 8/2005 |
| EP | 1586534 A1 | 10/2005 |
| EP | 1710173 A1 | 10/2006 |
| EP | 1792850 B1 | 6/2007 |
| EP | 1796516 A2 | 6/2007 |
| EP | 1849718 A1 | 10/2007 |
| EP | 1882432 B1 | 1/2008 |
| EP | 1892199 A1 | 2/2008 |
| EP | 1974638 A1 | 10/2008 |
| EP | 1997748 A1 | 12/2008 |
| EP | 2158829 A1 | 3/2010 |
| EP | 1882431 B1 | 4/2010 |
| EP | 2218653 A1 | 8/2010 |
| EP | 2230195 A1 | 9/2010 |
| EP | 2239211 A1 | 10/2010 |
| EP | 2284102 A1 | 2/2011 |
| EP | 2287090 A1 | 2/2011 |
| EP | 2364930 A2 | 9/2011 |
| EP | 2384133 B1 | 11/2011 |
| EP | 2412645 A1 | 2/2012 |
| EP | 2444339 A1 | 4/2012 |
| EP | 2465792 A2 | 6/2012 |
| EP | 2484505 A2 | 8/2012 |
| EP | 2484605 A1 | 8/2012 |
| EP | 2510805 A2 | 10/2012 |
| EP | 2343247 B1 | 11/2012 |
| EP | 2537778 A1 | 12/2012 |
| EP | 2559636 A1 | 2/2013 |
| EP | 2809006 A1 | 12/2014 |
| EP | 3575241 A1 * | 12/2019 ......... B65D 85/8043 |
| FR | 2556323 A1 | 6/1985 |
| FR | 2912124 A1 | 8/2008 |
| FR | 2946854 A3 | 12/2010 |
| FR | 2963332 A1 | 2/2012 |
| GB | 1307637 A * | 2/1973 ............ B65B 29/02 |
| GB | 1402799 A | 8/1975 |
| GB | 2061174 A | 5/1981 |
| GB | 2482032 A | 1/2012 |
| GB | 2485575 A | 5/2012 |
| GB | 2499201 A | 8/2013 |
| JP | S6266714 A | 3/1987 |
| JP | S62-130649 A | 6/1987 |
| JP | S62-168512 A | 7/1987 |
| JP | H0-1233688 A | 9/1989 |
| JP | 02289207 A | 11/1990 |
| JP | H0394377 A | 4/1991 |
| JP | H04176311 A | 6/1992 |
| JP | H05502817 A | 5/1993 |
| JP | H06510682 A | 12/1994 |
| JP | H07107915 A | 4/1995 |
| JP | 2779653 A | 7/1998 |
| JP | H11342077 A | 12/1999 |
| JP | H11342078 A | 12/1999 |
| JP | 2001-017094 A | 1/2001 |
| JP | 2001-082699 A | 3/2001 |
| JP | 2001-250161 A | 9/2001 |
| JP | 2002-274000 A | 9/2002 |
| JP | 2002-347852 A | 12/2002 |
| JP | 2003-522567 A | 7/2003 |
| JP | 2003-235733 A | 8/2003 |
| JP | 2004-097015 A | 4/2004 |
| JP | 2005-199070 A | 7/2005 |
| JP | 2006-510682 A | 3/2006 |
| JP | 2007-522856 A | 8/2007 |
| JP | 2007-530107 A | 11/2007 |
| JP | 2008-054840 A | 3/2008 |
| JP | 2008-510540 A | 4/2008 |
| JP | 2010-005003 A | 1/2010 |
| JP | 2010-500199 A | 1/2010 |
| JP | 2010-507418 A | 3/2010 |
| JP | 2010-528635 A | 8/2010 |
| JP | 2010-528737 A | 8/2010 |
| JP | 2013-529524 A | 7/2013 |
| JP | 2013-538609 A | 10/2013 |
| JP | 2014-504537 A | 2/2014 |
| JP | 2015-085086 A | 5/2015 |
| JP | 2017-507704 A | 3/2017 |
| JP | 2017-512082 A | 5/2017 |
| KR | 1020050107747 A | 11/2005 |
| KR | 20120114738 A | 10/2012 |
| MX | PA03011894 A | 3/2004 |
| NZ | 596919 A | 11/2013 |
| RU | 2005100732 A | 6/2006 |
| RU | 2380999 C2 | 2/2010 |
| RU | 2487067 A | 4/2012 |
| WO | 98/04460 A1 | 2/1998 |
| WO | 98/51396 A1 | 11/1998 |
| WO | 99/58035 A1 | 11/1999 |
| WO | 01/64416 A1 | 9/2001 |
| WO | 01/99047 | 12/2001 |
| WO | 02/078498 A1 | 10/2002 |
| WO | 03/073896 A1 | 9/2003 |
| WO | 2004/082390 A1 | 9/2004 |
| WO | 2005/044067 A1 | 5/2005 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2007/137974 A2 | 12/2007 |
| WO | 2008/011913 A1 | 1/2008 |
| WO | 2008/090122 A2 | 7/2008 |
| WO | 2008/107645 A2 | 9/2008 |
| WO | 2008/126045 A1 | 10/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010/013146 A3 | 4/2010 |
| WO | 2010/041179 A2 | 4/2010 |
| WO | 2010/085824 A1 | 8/2010 |
| WO | 2010/118545 A2 | 10/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/019902 A1 | 3/2012 |
| WO | 2012/038063 A1 | 3/2012 |
| WO | 2012/080928 A1 | 6/2012 |
| WO | 2012/100975 A1 | 8/2012 |
| WO | 2012/100977 A1 | 8/2012 |
| WO | 2012/127233 A2 | 9/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/064988 A1 | 5/2013 |
| WO | 2013/136209 A1 | 9/2013 |
| WO | 2013/171663 A1 | 11/2013 |
| WO | 2013/189555 A1 | 12/2013 |
| WO | 2013/189923 A1 | 12/2013 |
| WO | 2014/0001563 A1 | 1/2014 |
| WO | 2014/006048 A2 | 1/2014 |
| WO | 2014/007639 A1 | 1/2014 |
| WO | 2014/067507 A2 | 5/2014 |
| WO | 2014/090567 A1 | 6/2014 |
| WO | 2014/102702 A1 | 7/2014 |
| WO | 2014/127863 A1 | 8/2014 |
| WO | 2014/128542 A1 | 8/2014 |
| WO | 2014/163497 A1 | 10/2014 |
| WO | 2012/000878 A2 | 1/2015 |
| WO | 2015/028425 A2 | 3/2015 |

(56) References Cited

FOREIGN PATENT DOCUMENTS

| | | |
|---|---|---|
| WO | 2015/039258 A1 | 3/2015 |
| WO | 2015/062703 A1 | 5/2015 |
| WO | 2015/075584 A1 | 5/2015 |
| WO | 2015/082982 A1 | 6/2015 |
| WO | 2015/101394 A1 | 7/2015 |
| WO | 2015/107484 A1 | 7/2015 |
| WO | 2015/124619 A1 | 8/2015 |
| WO | 2015/128527 A1 | 9/2015 |
| WO | 2015/193774 A1 | 12/2015 |
| WO | 2016/012562 A1 | 1/2016 |
| WO | 2016/041596 A1 | 3/2016 |
| WO | 2016/077916 A1 | 5/2016 |
| WO | 2016/174671 A1 | 11/2016 |
| WO | 2016/186488 A1 | 11/2016 |
| WO | 2016/186493 A1 | 11/2016 |
| WO | 2016/207845 A1 | 12/2016 |
| WO | 2019/149875 A2 | 8/2019 |

OTHER PUBLICATIONS

International Preliminary Report on Patentability for International Application PCT/EP2019/082259, dated Oct. 29, 2020.

\* cited by examiner

SEAL FOR A SINGLE SERVE CAPSULE

PRIOR ART

The present invention is based on a single-serve capsule for the preparation of a beverage in a beverage-production machine, where the single-serve capsule has a base element that is impermeable to liquid, with a cavity for the acceptance of a beverage raw material and a capsule lid closing the cavity.

Single-serve capsules of this type are known from the prior art. By way of example, the documents DE 10 2012 223 291 A1, DE 10 2013 215 274 A1, DE 10 2012 109 186 A1 and DE 10 2012 105 282 A1 disclose single-serve capsules for single-serve-capsule machines respectively having a rigid or semirigid base element which encloses a cavity for the acceptance of a beverage raw material, for example ground roast coffee, instant coffee, chocolate powder, tea blend, milk powder or the like, where a capsule lid is used to close the cavity after filling of the single-serve capsule. In order that the beverage raw material does not lose its flavor during storage and transport of the single-serve capsule, the base element is configured to be impermeable to gas and liquid. The base element must moreover withstand comparatively high mechanical forces during the production of the beverage, because the extraction liquid is introduced into the cavity under high pressure and at high temperature, in order to produce the beverage by interacting with the beverage raw material.

The single-serve capsules known from the prior art therefore typically use thermoformed base elements made of polyethylene (PE), polypropylene (PP), polyvinyl chloride (PVC) and/or polyethylene terephthalate (PET) and/or metal, in particular aluminum, because base elements of this type can be produced at low cost, and are mechanically stable, and also impermeable to gas and liquid.

DISCLOSURE OF THE INVENTION

It is an object of the present invention to provide a single-serve capsule of the type mentioned in the introduction which, after production of the beverage, permits easier, more environmentally friendly and less costly disposal, and/or which is easier to produce.

The object is achieved with a single-serve capsule for the preparation of a beverage in a beverage-production machine, where the single-serve capsule has a base element with a flange and with a cavity for the acceptance of a beverage raw material and a capsule lid closing the cavity, where the capsule lid is secured on the flange and there is a seal provided on the area opposite to the capsule lid, said seal provided being semiplastic.

The expositions provided in relation to this subject matter of the present invention apply equally to the other embodiments of the present invention, and vice versa. Features provided in connection with this embodiment of the present invention can be adopted in other aspects of the subject matter of the present invention.

The object is further achieved with a single-serve capsule for the preparation of a beverage in a beverage-production machine, where the single-serve capsule has a base element with a flange and with a cavity for the acceptance of a beverage raw material and a capsule lid closing the cavity, where the capsule lid is secured on the flange and there is a seal provided on the area opposite to the capsule lid, said seal provided being semielastic.

The expositions provided in relation to this subject matter of the present invention apply equally to the other embodiments of the present invention, and vice versa. Features provided in connection with this embodiment of the present invention can be adopted in other aspects of the subject matter of the present invention.

The following expositions apply equally to both aspects of the subject matter of the present invention.

These aspects of the subject matter of the present invention provide a single-serve capsule which is by way of example used for the production of beverages. The single-serve capsule is used by way of example to produce coffee or espresso or tea. For this purpose, the single-serve capsule has a base element with a base and side walls which enclose a cavity which is filled with the beverage raw material. The cavity is then closed by a capsule lid. For the production of the beverage, by way of example, hot water flows through the single-serve capsule.

It is preferable that the material used to manufacture the seal differs from that used to manufacture the base element. The base element has preferably been manufactured from a metallic material, in particular aluminum.

The single-serve capsule preferably has a side wall and a base. The side wall provided is preferably conical or cylindrical, and in particular connected to the base to form a one-piece element. At its end opposite to the base, the side wall has a flange which is in particular circular and which preferably is connected to the side wall to form a one-piece element, and provided at an angle to said side wall, in particular an obtuse angle.

On one side of the flange there is generally a capsule lid arranged, in particular sealed, where said lid seals a cavity in the base element in which a beverage raw material is located. The seal is provided on the flange side opposite to the capsule lid.

The seal provided in the invention is semiplastic and/or semielastic. After deformation, therefore, the seal does not remain in the deformed shape and/or does not resume its original shape. By way of example, the seal deforms semiplastically during the closure of the brewing chamber. A good sealing action is thus achieved, and the sealing action is also maintained at least to some extent when the closing pressure of the chamber components decreases. For the purposes of the invention, the word "semiplastically" implies that there is only partial shape-reversion of the impression that the brewing chamber impresses into the seal. The shape-reversion is preferably 10-40% of the maximal impression produced by the brewing chamber. The change of the cross section of the seal after deformation and shape-reversion preferably amounts to between 10 and 40%, based on the cross section of the seal before the deformation. The seal is accordingly semielastic, and undergoes partial shape-reversion after the pressure exerted by the brewing chamber has decreased. The seal therefore differs from an elastomeric seal which undergoes complete shape-reversion when the pressure exerted by the brewing chamber decreases. The seal also differs from a plastically deformable seal where the maximal deformation of the seal is at least in essence retained.

The seal preferably, or in the invention, comprises a biopolymer. It has preferably been manufactured entirely from a biopolymer.

Biopolymers in the present invention are polymers which are obtained from renewable feedstocks and/or are biodegradable, in particular completely biodegradable. The production of said biopolymers here can include extensive purification steps and/or modification steps. It is also possible in the invention to use mixtures of two or more biopolymers, and it is also possible here to use mixtures of two or more biopolymers of different classes, for example gelatins and polysaccharides or gelatins and cellulose or polysaccharides and cellulose, or else gelatins and polysaccharides and cellulose. These materials have the further advantage that the base elements obtained therefrom can be produced in compliance with vegan and/or kosher and/or halal requirements.

It is preferable that at least a partial region of the seal consists at least partially of gelatin, polysaccharides, polylactides, celluloses or mixtures of two or more of these biopolymers. The proportion of biopolymer in the material from which the seal is produced is preferably >30% by weight, preferably >40% by weight, with still greater preference >50% by weight and with most preference >55% by weight. The material preferably comprises glycerol and water. This mixture preferably comprises a crosslinking agent.

By way of example, a tannin is suitable as crosslinking agent.

The seal can also in particular consist entirely of biopolymer, in particular gelatin.

It is preferable that at least a partial region of the seal consists at least partially of gelatin and/or polysaccharide and/or cellulose. The proportion of gelatin and/or polysaccharide and/or cellulose in the material from which at least a partial region of the seal is produced is preferably >70% by weight, preferably >80% by weight, with still greater preference >90% by weight and with most preference >95% by weight. The seal can in particular also consist entirely of biopolymer.

It is preferable that at least a partial region of the seal consists at least partially of gelatin and/or hydroxypropyl-methylcellulose and/or pullulan. The proportion of gelatin and/or hydroxypropyl-methylcellulose and/or pullulan in the material from which at least a partial region of the seal is produced is preferably >70% by weight, preferably >80% by weight, with still greater preference >90% by weight and with most preference >95% by weight. The seal can in particular also consist entirely of biopolymer.

Gelatin is preferably an animal protein, preferably a mixture of substances. Main constituent is preferably denatured or hydrolyzed collagen, which can be produced from the connective tissue of various animal species, especially pigs and cattle, but also fish and poultry. However, the gelatin can also be plant-derived gelatin, these mostly being polysaccharides.

Materials used as gelatin are preferably in particular gelatins of the type used in the field of pharmaceutical technology for the production of hard gelatin or of soft gelatin capsules. The gelatins can have been foamed. This foaming can be achieved by using a gas, in particular air.

The water content of the gelatins in the seal is preferably 1-50% by weight, preferably 6-20% by weight, with still greater preference 9-18% by weight, and with much more preference 9-16% by weight.

The Bloom value of the gelatins of the type used for the production of the seal can preferably be 10-350 Bloom, preferably 50-300 Bloom, with particular preference 150-280 Bloom, or 180-280 Bloom.

The gelatin has preferably been hardened and/or rendered insoluble in water. In an alternative to this, the gelatin has been hardened and/or rendered temporarily insoluble in water or temporarily resistant to moisture. The expression "gelatin that is temporarily insoluble in water or temporarily resistant to moisture" means by way of example gelatin that exhibits signs of decomposition after a certain time, for example after 1-28 days, in particular 1-14 days, with preference 1-7 days, with particular preference 1-5 days, after use of the capsule and/or exposure to environmental effects, for example moisture, insolation and/or the effect of microorganisms.

The above can be achieved by way of example via crosslinking of the product with one or more chemicals, i.e. in particular a procedure that effectively increases the molecular weight of the protein. Materials suitable for this purpose are by way of example alginic acid alkylene glycol derivatives, sodium-peroxide-oxidized alginic acid, amylopectin dialdehyde octenyl succinate, bisacryloylurea, bis (azidinethyl) sulfone, bis(bromoacetyl) ethylenediamine, bis (chloromethyl) adipate, bis(chloromethyl) diethylmalonate, bis(chloroacetyl) dimethylenediamine, benzene-disulfonyl fluoride, bromoacetic acid, carbodiimides, carboxybenzyl bromide, bis(chloroethyl)-urea, chromium acetate and chrome alums, cyanuric chloride, dialdehyde starch treated with caustic soda, dichlorohydroxy-s-triazine, sodium salt, dichloroquinoxoline carbonyl chloride, diethyleneurea, diformyldihydroxytrioxanonane, ditrioxynaphthalene, difluorodinitrobenzene, dihydroxydioxane, diglycidyl mono (propylene chlorohydrin) ether of glycerol, dihydroxymaleic acid, di(maleimido)benzene, di(maleimido)hexane, dimaleimide, dimethylaminophosphoryl, bis(dimethylamino)phosphoryl chloride, dimethylbis(vinylsulfonyl)benzene, disodium salt, tris(sulfate ethyl)sulfonium internal ether salts, ethylene glycol, ethoxymethyl isocyanate, formalin(formaldehyde, fluorosulfonylacetophenone, glycerol, gum arabic, for example oxidized with periodic acid, glutaraldehyde, hydroxytetramethylhydrooxazonium chloride, lactic acid, methotoluenesulfonate, mono-I-O-bromoethyl maleate, methylenediethanesulfonamide, haloalcohol methanesulfonate, mercaptoethylaziridine, methylglucanopyranoside, naphthalenedisulforyl fluoride, pectic acid, peroxydisulfate, phenol-formaldehyde resins, phenyltriazinidinylsilane, phloroformaline, phosphonitrile chloride, phloroglucinol, polyurethane, polyformal(s), polyacrolein, polyvinyl maleate, potassium permanganate, potassium ferrocyanide, pyromellitic anhydride, resorcinol diglycidyl ether, resorcinol, saccharide(s), sulfanilinodichloro-s-triazine, sodium hypochlorite, sodium salt of dichlorohydroxytriazine, stearylaminobenzoylacetic acid, sucrose, oxidized with periodate, tannin, tetrahydroxyphenol, trimellitic anhydride, trimethylenebis(isomaleimide), tris(chloroacetyl)hexahydrotriazine, tetraisopropyl titanate and/or a mixture of these made of at least two of the abovementioned substances.

Polysaccharide is the main constituent of the cell walls of plants. The polysaccharide provided preferably takes the form of cellulose, for example methylcellulose and/or hydroxypropylmethyl-cellulose and/or cellulose acetate. Other cellulose-based compounds can likewise be used. Alternatively, the polysaccharide provided can take the form of pullulan. The polysaccharide can be provided in the form of mixture of a plurality of substances. At least a partial region of the base element and/or of the capsule lid can moreover consist entirely or partially of cellulose, for example methylcellulose and/or hydroxypropylmethylcellulose and/or cellulose acetate. Other cellulose-based compounds can likewise be used.

The term "celluloses" in the invention can also mean derivatives thereof, in particular cellulose ethers, which are produced by partial or complete substitution of the hydrogen atoms of the hydroxy groups in the cellulose. These cellulose ethers can preferably be selected from the group consisting of carboxymethylcellulose, methylcellulose, ethylcellulose, hydroxyethylcellulose, hydroxypropylcellulose, methylethylcellulose, hydroxyethylmethyl-cellulose, hydroxypropylmethylcellulose, ethyl hydroxyethylcellulose and carboxymethylhydroxy-ethylcellulose. It is also possible in the invention here to use mixtures of two or more of said cellulose ethers.

Very particular preference is given to hydroxypropylmethylcellulose. A correspondingly suitable hydroxypropylmethylcellulose is by way of example also used in the production of hard vegan capsules in the field of pharmaceutical technology.

The water content of the hydroxypropylmethylcellulose in the seal is preferably 1-23% by weight, with still more preference 1.5-20% by weight, with much more preference 2.0-15% by weight and with most preference 2.5-10% by weight.

When the expression "plastic based on gelatin and/or polysaccharide and/or cellulose" is used below, it preferably means in particular plastic based on gelatin and/or hydroxypropylmethylcellulose and/or pullulan.

The biopolymer, in particular the plastic based on gelatin and/or polysaccharide and/or cellulose, is preferably provided in the form of film/foil, which is then molded, in particular thermoformed, in order to obtain the seal. However, it is also possible that the biopolymer, in particular the plastic, is liquefied and cast and/or applied through a nozzle, in order to obtain the desired shape of the seal. After casting, the biopolymer is hardened, in particular with exposure to low temperature. The resultant seal can be arranged on the base element, in particular at the flange thereof.

Alternatively, a shaped body corresponding to the required seal is preferably immersed singly or repeatedly in a liquid biopolymer, in particular a liquid plastics composition, until the desired thickness of material is achieved.

With still more preference, the biopolymer is placed into a channel which forms additional shaping at the exterior edge of the flange and of the capsule bodies, for example by using a nozzle, preferably while the single-serve capsule rotates. With very particular preference, at least a partial region of the base element, in particular the flange, is cooled before, during and/or after the application of the biopolymer, in particular of the gelatin.

The application of the biopolymer can take place after the closure of the single-serve capsule by a lid foil. However, it is also possible to provide the seal to the base element and then to fill, and close, the base element.

The biopolymer is by way of example hardened by means of drying, heat treatment and/or low-temperature treatment and/or crosslinking, for example by means of IV radiation or UV radiation, until the biopolymer, in particular the plastic, has solidified to the extent that it permits the use as base element together with the seal in particular in further production.

A seal with a plurality of layers can be produced by a repeated immersion of the shaped body. The shaped body can be immersed successively in various liquid biopolymers. The layers produced by the immersion in various liquid biopolymers can differ in respect of their optical properties or their UV resistance, hardness, deformability and/or resistance to liquids.

Preference is given to a foamed layer, in particular a foamed layer comprising gelatin. The foaming can by way of example be achieved by using a blowing gas. This layer is preferably combined with an adhesion-promoter layer, which with particular preference comprises gelatin. With particular preference, this adhesion-promoter layer improves the adhesion between the foamed layer and a metal base element, in particular a base element comprising aluminum. Another layer can be a protective protection layer which by way of example prevents softening and/or swelling of a biopolymer layer, in particular of a gelatin layer.

With very particular preference, the seal comprises a foamed gelatin layer and an adhesion-promoter layer which improves the adhesion to an aluminum base element, and a protective layer, which at least reduces, preferably prevents, softening and/or swelling, in particular of the foamed layer. The foamed layer preferably has a greater layer thickness than at least one other layer, preferably one of the other two layers.

It is preferable that at least that part of the surface of the base element, in particular of the collar/flange, that is in contact with the biopolymer, in particular with the gelatin, is pretreated in order to improve the adhesion between biopolymer and the base element, in particular a base element made of aluminum. This type of pretreatment can by way of example be a plasma treatment and/or a treatment with acid.

In this connection, the shaped body is advantageously an immersible shaped body corresponding to the seal, where the immersible shaped body has a shape with an immersible region which is immersed in the liquid biopolymer. The immersible region preferably corresponds to a negative of the shape of the required seal. During the production process, the immersible region of the shape is covered with a layer of the biopolymer. In a further step, the shaped body can be withdrawn from the liquid biopolymer. The biopolymer layer covering the shape of the shaped body can solidify, and can be dried. A corresponding process is known by way of example in the field of pharmacy as the Colton process for the production of pharmaceutical capsules. In particular, the covered shaped body can, during the solidification and/or drying procedure, be controlled in one or more dimensions in order to achieve targeted adjustment, in particular of the shape and/or the thickness, to the design of the base element.

The present invention also provides a process for the production of the single-serve capsule of the invention, where a shaped body is immersed in a biopolymer bath, and a film thus forms on the surface of the shaped body, and said film is then cooled and/or dried. Finally, the single-serve capsule is released from the shaped body and optionally also trimmed.

It is preferable that the biopolymer bath comprises gelatin.

It is preferable that additional shaping has been provided to the exterior edge of the flange.

It is preferable that the base element has been manufactured from metal, in particular aluminum.

The present invention further provides a process for the production of the seal of a single-serve capsule, where a shaped body is immersed in a biopolymer bath, and a film thus forms on the surface of the shaped body, and said film is then cooled and/or dried.

The expositions provided in relation to this subject matter of the present invention apply equally to the other embodiments of the present invention, and vice versa. Features provided in connection with this embodiment of the present invention can be adopted in other aspects of the subject matter of the present invention.

This subject matter of the present invention provides a process for the production of a seal of a single-serve capsule, where a shaped body is immersed in a biopolymer bath and a biopolymer film then adheres on said body, and said film solidifies there and then can be passed for further use. The film is optionally removed from the shaped body.

It is preferable that the shaped body is the negative of the required seal.

The present invention also provides a process for the production of a single-serve capsule where the gelatin is applied in the form of liquid or paste to the flange of the base element, and hardens there.

The expositions provided in relation to this subject matter of the present invention apply equally to the other embodiments of the present invention, and vice versa. Features provided in connection with this embodiment of the present invention can be adopted in other aspects of the subject matter of the present invention.

It is preferable that the base element of the single-serve capsule has the shape or surface on which a film of biopolymer adheres and solidifies and then forms the seal for the single-serve capsule. It is preferable that the flange side on which the film is applied is oriented in a manner such that gravity presses the film onto the flange, and that the film solidifies there. It is preferable that at least the flange is cooled before, during and/or after the application of the film. The film can be applied in that an application means and the base element move relative to one another, in particular rotate. It is possible to apply a plurality of layers.

The invention also provides a process for the production of the seal of a single-serve capsule, where a biopolymer, in particular the plastic based on gelatin and/or polysaccharide and/or cellulose, is provided in the form of film/foil which is then molded, in particular thermoformed, and where the molded foil is used as seal for the single-serve capsule.

The expositions provided in relation to this subject matter of the present invention apply equally to the other embodiments of the present invention, and vice versa. Features provided in connection with this embodiment of the present invention can be adopted in other aspects of the subject matter of the present invention.

The seal can be bonded to the base element by way of example by adhesive bonding or sealing.

The present invention also provides a process for the production of the seal of a single-serve capsule, where the biopolymer, in particular the plastic based on gelatin and/or polysaccharide and/or cellulose, is liquefied so that it can then be cast and/or sharpened, in order thus to obtain the desired shape of the seal.

The expositions provided in relation to this subject matter of the present invention apply equally to the other embodiments of the present invention, and vice versa. Features provided in connection with this embodiment of the present invention can be adopted in other aspects of the subject matter of the present invention.

In this subject matter of the present invention, the liquid biopolymer, in particular the gelatin, is liquefied or is already in liquid form when provided, and then is cast and/or injected into a mold and thus shaped to the shape of the seal.

It is preferable that the biopolymer is applied to the flange of the single-serve capsule and hardens there.

It is preferable that at least a partial region of a base element of the single-serve capsule is cooled before, during and/or after the application of the biopolymer.

The present invention also provides a process for the production of a beverage using a single-serve capsule of the invention, where the single-serve capsule, in particular the flange thereof, is clamped between two closing brewing-chamber elements, and the seal is thus deformed, and when the brewing-chamber elements are again opened only partial shape-reversion of the deformation then takes place.

The expositions provided in relation to this subject matter of the present invention apply equally to the other embodiments of the present invention, and vice versa. Features provided in connection with this embodiment of the present invention can be adopted in other aspects of the subject matter of the present invention.

In this subject matter of the present invention, the seal is deformed during closure of the brewing-chamber elements. The yield point of the biopolymer is exceeded here to an extent such that the deformation is semiplastic. This results in a very good sealing action, and the ejection of the single-serve capsule from the beverage-production apparatus is assisted.

Further details, features and advantages of the invention can be found from the drawings, and also from the description below of preferred embodiments with reference to the drawings. The drawings here merely illustrate examples of embodiments of the invention which do not restrict the essential concept of the invention.

EMBODIMENTS OF THE INVENTION

Figure 1:
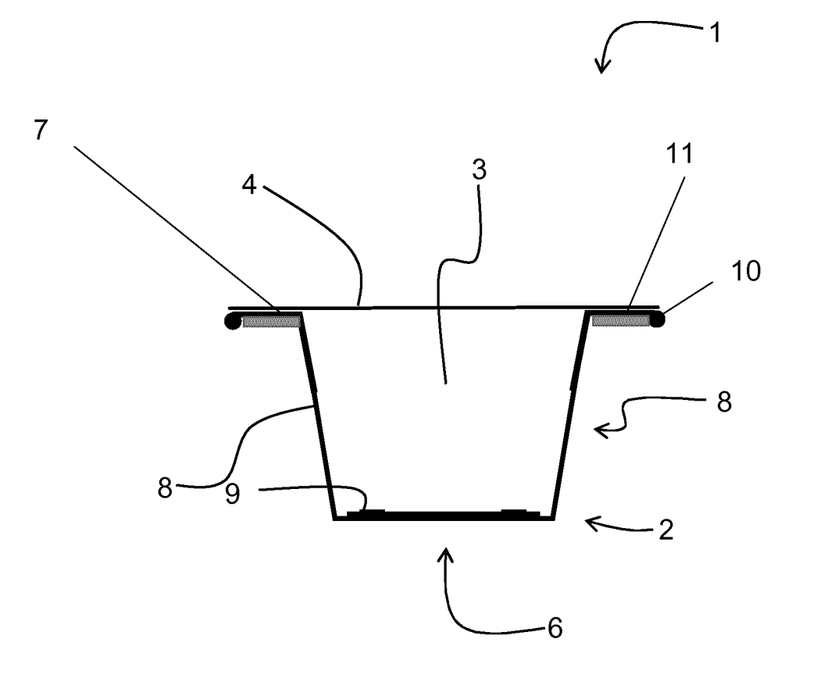
FIG. 1 is a diagrammatic sectional view of a single-serve capsule in an example of an embodiment of the present invention.

FIG. 1 is a diagram of a sectional view of a single-serve capsule 1 for the preparation of a beverage in a (not depicted) beverage-production machine in an example of an embodiment of the present invention.

The single-serve capsule 1 has a pot-shaped base element 2 and a capsule lid 4 secured on a peripheral flange 7 of the base element 2. The capsule lid 4 has in particular been welded or adhesively bonded to the flange 7. The base element 2 consists of a base region 6 and a wall region 8, these preferably being provided as a one-piece element. A cavity 3, filled with beverage raw material (for reasons of clarity not illustrated) and closed by the capsule lid 4, is configured within the base element 2. Arranged on the flange side opposite to the capsule lid (4) is a seal, which deforms during the closure of the brewing chamber. The seal has preferably been manufactured at least partially from gelatin. It is preferable that the seal material is applied in liquid form to the flange and hardens there, in particular in that the seal material is cooled. It is preferable here that the base element of the single-serve capsule is rotated by 180°, so that gravity presses the liquid seal material against the flange. It is preferable that the base element, in particular the flange, is cooled before application of the seal material. On opening of the brewing chamber, the deformation is only partially reversed. A deformation therefore remains in the seal after the opening of the brewing chamber. The seal undergoes partial elastic shape-reversion, but does not resume its original shape.

In use, the single-serve capsule 1 is introduced into a brewing chamber in a beverage-production machine. The brewing chamber is then closed, for example in that two brewing-chamber elements are moved relatively to one another. The capsule lid 4 and the base region 6 are perforated here, successively or simultaneously, and extraction liquid is introduced under pressure into the cavity 3 through the perforation apertures in the capsule lid 4. The interaction between the extraction liquid and the beverage raw material produces the desired beverage, which leaves the single-serve capsule 1 through the perforation apertures in the base region 6 and is introduced into a beverage vessel. Any possible particles of the beverage raw material are filtered from the beverage by the filter medium 9 and retained in the single-serve capsule 1. During the closing of the brewing-chamber elements, the seal 11 is deformed and therefore, after the brewing procedure, traces of the brewing chamber remain visible in the seal material, these however being smaller than the deformation of the seal during closure of the brewing chamber.

LIST OF REFERENCE SIGNS

1 Single-serve capsule
2 Base element
3 Cavity
4 Capsule lid
5 Partial region
6 Base region
7 Flange
8 Wall region
9 Filter medium
10 Additional shaping
11 Coating

What is claimed is:

1. A single-serve capsule for a preparation of a beverage in a beverage-production machine, wherein the single-serve capsule comprises:
   a) a base element with a flange and with a cavity for acceptance of a beverage raw material, wherein the base element is manufactured from aluminum and consists of a base region and a wall region having the flange provided as a one-piece element;
   b) a capsule lid closing the cavity; and
   c) a seal formed of materials comprising:
      an adhesion-promoter layer;
      a foamed gelatin layer; and
      a protective protection layer;
      wherein the materials used to manufacture the seal differ from the aluminum used to manufacture the base element;
   wherein the capsule lid is secured on a side of the flange and the seal is provided on an opposite side of the flange to the capsule lid;
   wherein the seal is adapted to deform during closure of a brewing chamber of the beverage-production machine, and wherein the seal is adapted to undergo only partial shape-reversion of deformation during opening of the brewing chamber such that the seal does not undergo complete shape-reversion when pressure exerted by the brewing chamber decreases and such that maximal deformation of the seal is not completely retained such that such that the seal has a cross-section that has a change after deformation and only partial shape-reversion of between 10% and 40% based on the cross-section of the seal before deformation;
   wherein the seal provided is partially plastic;
   wherein additional shaping has been provided to an exterior edge of the flange;
   wherein the adhesion-promoter layer comprises gelatin for improvement of adhesion of the foamed gelatin layer to the aluminum of the base element on the opposite side of the flange to the capsule lid; and
   wherein the foamed gelatin layer has a thickness that is greater than a thickness of the adhesion-promoter layer, a thickness of the protective protection layer, or both.

2. The single-serve capsule as claimed in claim 1, wherein the foamed gelatin layer is disposed on the base element.

3. The single-serve capsule as claimed in claim 1, wherein the base element consists of aluminum.

4. The single-serve capsule as claimed in claim 1, wherein the capsule lid and the base region are adapted to be perforated to form perforation apertures, and wherein the single-serve capsule is adapted to receive liquid through the perforation apertures in the capsule lid and the beverage is adapted to leave the single-serve capsule through the perforation apertures in the base region.

5. A single-serve capsule for a preparation of a beverage in a beverage-production machine, wherein the single-serve capsule comprises:
   a) a base element with a flange and with a cavity for a beverage raw material, wherein the base element is manufactured from aluminum and consists of a base region and a wall region having the flange provided as a one-piece element;
   b) a capsule lid closing the cavity; and
   c) a seal formed of materials comprising:
      an adhesion-promoter layer;
      a foamed gelatin layer; and
      a protective protection layer;
      wherein the materials used to manufacture the seal differ from the aluminum used to manufacture the base element;
   wherein the capsule lid is secured on a side of the flange and the seal is provided on an opposite side of the flange to the capsule lid;
   wherein the seal is adapted to deform during closure of a brewing chamber of the beverage-production machine, and wherein the seal is adapted to undergo only partial shape-reversion of deformation during opening of the brewing chamber such that the seal does not undergo complete shape-reversion when pressure exerted by the brewing chamber decreases and such that maximal deformation of the seal is not completely retained such that the seal has a cross-section that has a change after deformation and only partial shape-reversion of between 10% and 40% based on the cross-section of the seal before deformation;
   wherein the seal provided is partially elastic;
   wherein additional shaping has been provided to an exterior edge of the flange;
   wherein the adhesion-promoter layer comprises gelatin for improvement of adhesion of the foamed gelatin layer to the aluminum of the base element on the opposite side of the flange to the capsule lid;
   and
   wherein the foamed gelatin layer has a thickness that is greater than a thickness of the adhesion-promoter layer, a thickness of the protective protection layer, or both.

6. The single-serve capsule as claimed in claim 2, wherein the foamed gelatin layer is disposed on the base element.

7. The single-serve capsule as claimed in claim 5, wherein the base element consists of aluminum.

8. The single-serve capsule as claimed in claim 5, wherein the capsule lid and the base region are adapted to be perforated to form perforation apertures, and wherein the single-serve capsule is adapted to receive liquid through the perforation apertures in the capsule lid and the beverage is adapted to leave the single-serve capsule through the perforation apertures in the base region.

\* \* \* \* \*